United States Patent
Wang

(10) Patent No.: US 7,854,043 B2
(45) Date of Patent: Dec. 21, 2010

(54) BINDING MACHINE

(76) Inventor: Bei Wang, Room 1809 Building A, Metropolis Square, Tangxia Town, Dongguan, Guangdong (CN)

( * ) Notice: Subject to any disclaimer, the term of this patent is extended or adjusted under 35 U.S.C. 154(b) by 507 days.

(21) Appl. No.: 11/874,101

(22) Filed: Oct. 17, 2007

(65) Prior Publication Data

US 2009/0100653 A1    Apr. 23, 2009

(51) Int. Cl.
*B25B 25/00* (2006.01)
(52) U.S. Cl. .................. 24/68 CD; 410/100; 254/218; 242/385.4
(58) Field of Classification Search ............. 24/68 CD, 24/68 D, 68 T, 71 ST, 71 R, 71.1, 69 CT; 254/218, 217, 223, 237, 238, 239, 214, 216, 254/225; 242/388.1; 410/100, 103
See application file for complete search history.

(56) References Cited

U.S. PATENT DOCUMENTS

| | | | | |
|---|---|---|---|---|
| 5,271,606 A | * | 12/1993 | Kamper | 254/217 |
| 5,542,798 A | * | 8/1996 | Rawdon et al. | 410/100 |
| 5,611,520 A | * | 3/1997 | Soderstrom | 254/218 |
| 5,762,455 A | * | 6/1998 | Long | 410/100 |
| 6,195,848 B1 | * | 3/2001 | Jackson et al. | 24/68 CD |
| 6,547,218 B2 | * | 4/2003 | Landy | 254/217 |
| 6,609,275 B1 | * | 8/2003 | Lin | 24/68 CD |
| 7,100,902 B1 | * | 9/2006 | Lu | 254/218 |
| 7,296,326 B2 | * | 11/2007 | Madachy et al. | 24/68 CD |
| 7,350,767 B2 | * | 4/2008 | Huang | 254/218 |
| 7,377,484 B1 | * | 5/2008 | Williams | 254/218 |
| D593,385 S | * | 6/2009 | Wang | D8/44 |
| 2001/0045548 A1 | * | 11/2001 | Landy | 254/217 |
| 2003/0071251 A1 | * | 4/2003 | Hu | 254/218 |
| 2004/0094650 A1 | * | 5/2004 | Huang | 242/385.4 |

* cited by examiner

*Primary Examiner*—Robert J Sandy
*Assistant Examiner*—Rowland D Do
(74) *Attorney, Agent, or Firm*—Global IP Services; Tianhua Gu

(57) ABSTRACT

This practical new model makes an improved binding machine known to the public, which includes main body, handle, ratchet wheel, roller, fastening belt, latch reed spring, control plate. Among them, the handle's side board is linked with the main section's side board through torsion spring. In this manner, when the fastening belt needs to be tightened as the binding machine is being used, the user can press down the handle which will resume its initial position with the bounce force of the torsion spring. It is not necessary for the user to push it back to the initial position after pressing the handle down. It is very easy and labor-saving with higher efficiency. Furthermore, it can also set a coil spring in the outside end of the roller. The fastening belt can withdraw inside the main section automatically, which is very convenient.

9 Claims, 5 Drawing Sheets

BINDING MACHINE

FIELD OF THE INVENTION

This practical new model is about a kind of binding machine, the kind that binds the objects and has fastening belt to rapidly fixate and let loose the objects by rotating the handle.

BACKGROUND OF THE INVENTION

The binding machine is widely used in the daily life. It is mostly composed of main body, handle, ratchet wheel, roller, fastening belt, latch reed spring and control plate. The fastening belt whose tail is fixated in the roller can be pulled out or withdraw inside the main body. Then, through moving the handle, it can fasten or unfasten the objects.

There is one common problem among the usual binding machines in the market, which is that when the fastening belt needs to be tightened, the user has to push upward and press down the handle constantly. It can easily cause fatigue to the user and also has low efficiency. What is more, in some binding machines, there is no device for the fastening belt to withdraw automatically. After they finish using the binding machine and need to put back the fastening belt inside the main body, they need to press the handle repeatedly to make the fastening belt retract to the inside of the main body slowly. It is very time-consuming and cause fatigue to the users' hands.

SUMMARY OF THE INVENTION

This new practical model is to provide an improved binding machine aiming at the weakness of the existing binding machines. It is easier to use with higher effectiveness.

To achieve the above aim, this practical new model includes:

Main Body: the said main body is a bottom board of the same level and has the two sides curved up to form the side boards. Between the two side boards there is the hollow space for holding objects. There is ratchet at the top of the front part of the side boards with holes underneath the ratchet.

Handle: the handle goes over the main body atop. There are holes at the lower end of side boards. Side board of the handle and the main body's side board are linked by torsion spring.

Two ratchet wheels: they are on the left and right sides of the main body with holes on them.

Roller: the roller goes through the holes in the main body's side board, handle's side board and the ratchet wheels, with the mid section for the fastening belt wrapping around.

Fastening belt: the fastening belt is in the hollow space between the two side boards of the main body. Its tail is fixed to the roller and the head extending to the outside of the main body.

Latch Reed spring is between the two side boards of main body at the end of the roller with the top connecting the ratchet wheel.

Control plate is between the handle's two side boards. There is the compression spring in between its top and the handle's top. Its bottom goes match with the ratchet wheel and the ratchet on the top of the main body's side board.

The said roller crosses the extended section outside the main body's side board. There is a coil spring, which is on the same side of the main body as the torsion spring linking the main body's side board and that of the handle. The coil spring can enable the binding machine to retract to the inside of the main part when users finish using them.

There is a plate spring in the hollow space between the main body's two side boards of the mentioned main body. The head of the plate spring extends to the front below of the scroll. The tail of it goes match with the extruded section that hinges the end of main body's side board.

There is a grip at the top end of the handle. The mid section of the grip is in the shape of concave circular arc. It is more comfortable for the hands when holding it.

There is a moving component on the top end of the control plate whose front end contains two slots for holding the fingers. In this way the fingers can be at more ease when the user pulls the control plate upward.

The section in the said roller that goes through the main body's side board has a knob-shape cover to protect the torsion spring and coil spring, also to make the products better looking.

The said roller composes of two beam-shape objects with sections in the form of a bow. There is a proper space between the two beam-shape objects for the end of the fastening belt going through it.

After adopting the above technique, this practical new model has the efficiency like this. Handle's side board is connected with main body's side board though torsion spring. In this way, if the fastening belt needs to be tightened when the binding machine is in use, the handle can automatically resume the initial position with the bounce of torsion spring after the user presses down the handle. The user does not need to push the handle back to the initial position every time when he/she presses down the handle. It is very labor-saving and has significantly enhanced effectiveness. Also the design of coil spring can also make the fastening belt withdraw to the inside of main body after the user finishes using the binding machine. It is very convenient.

BRIEF DESCRIPTION OF THE DRAWINGS

The following gives further illustration to this practical new model together with the attached pictures.

DETAILED DESCRIPTION OF THE INVENTION

The following is a better example to execute this practical new model, which thus does not restrict the protective scope of this practical new model.

Figure 1:
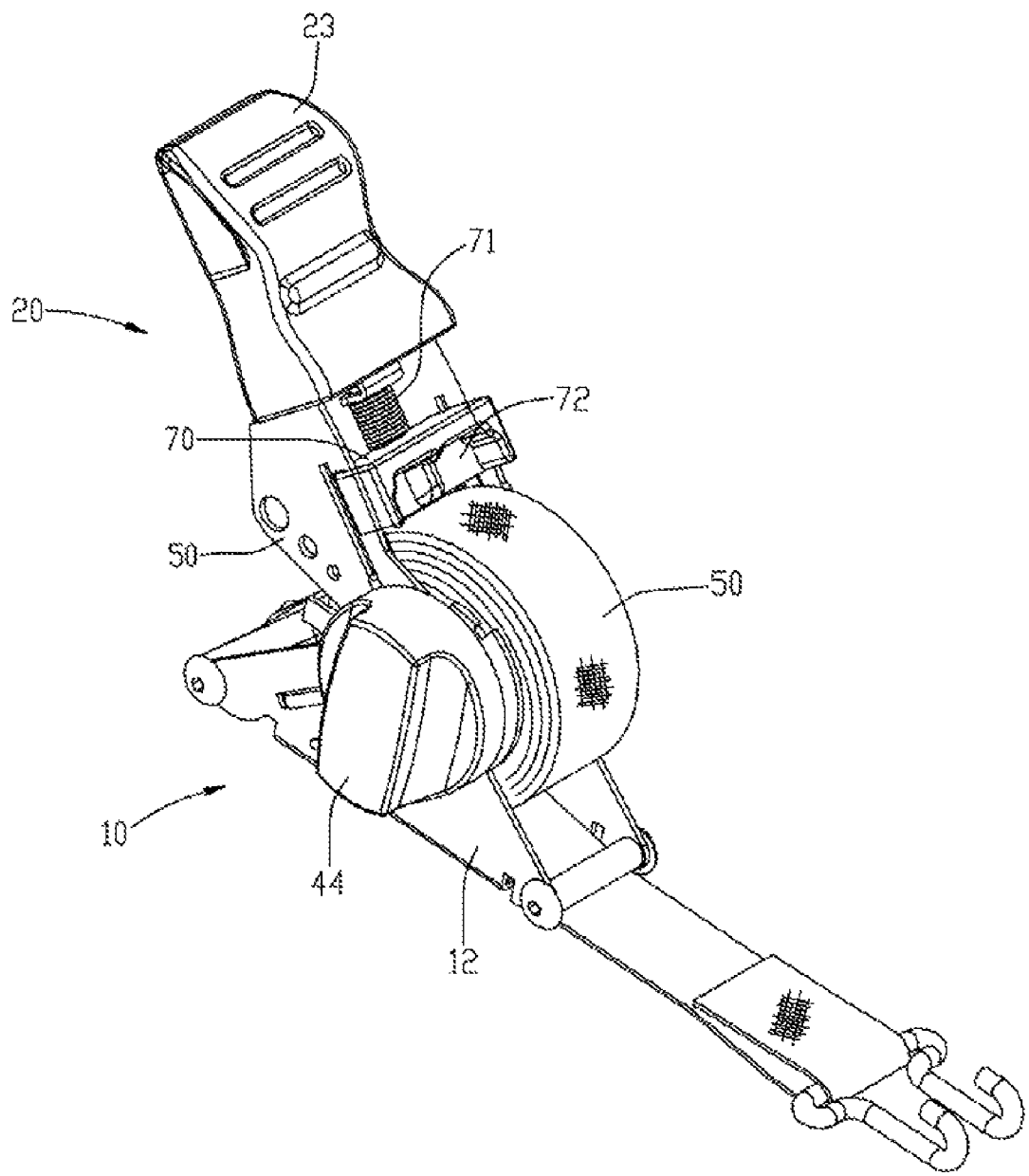
FIG. 1: one of the schematic view of the whole structure of this practical model
Figure 2:
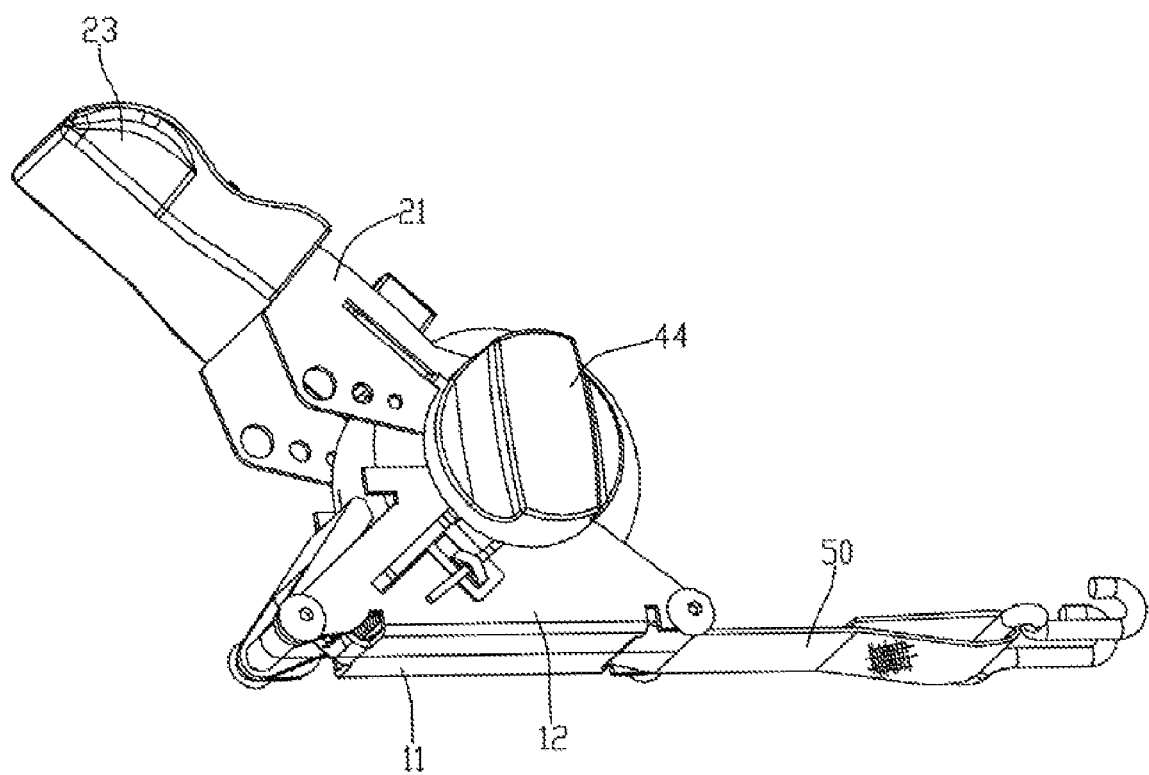
FIG. 2: the schematic view of the whole structure of this practical model from another angle
Figure 3:
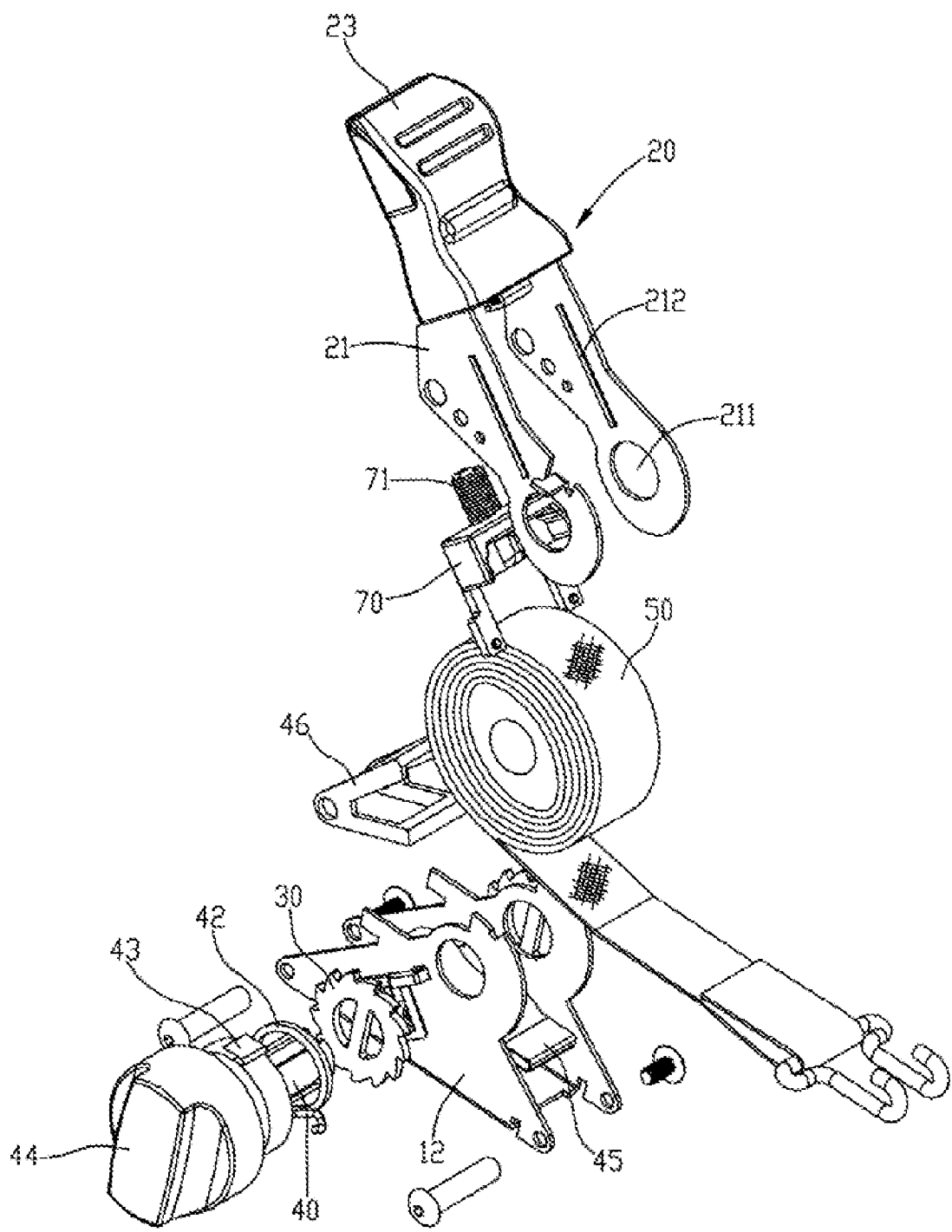
FIG. 3: one of the breaking-down view of this practical new model
Figure 4:
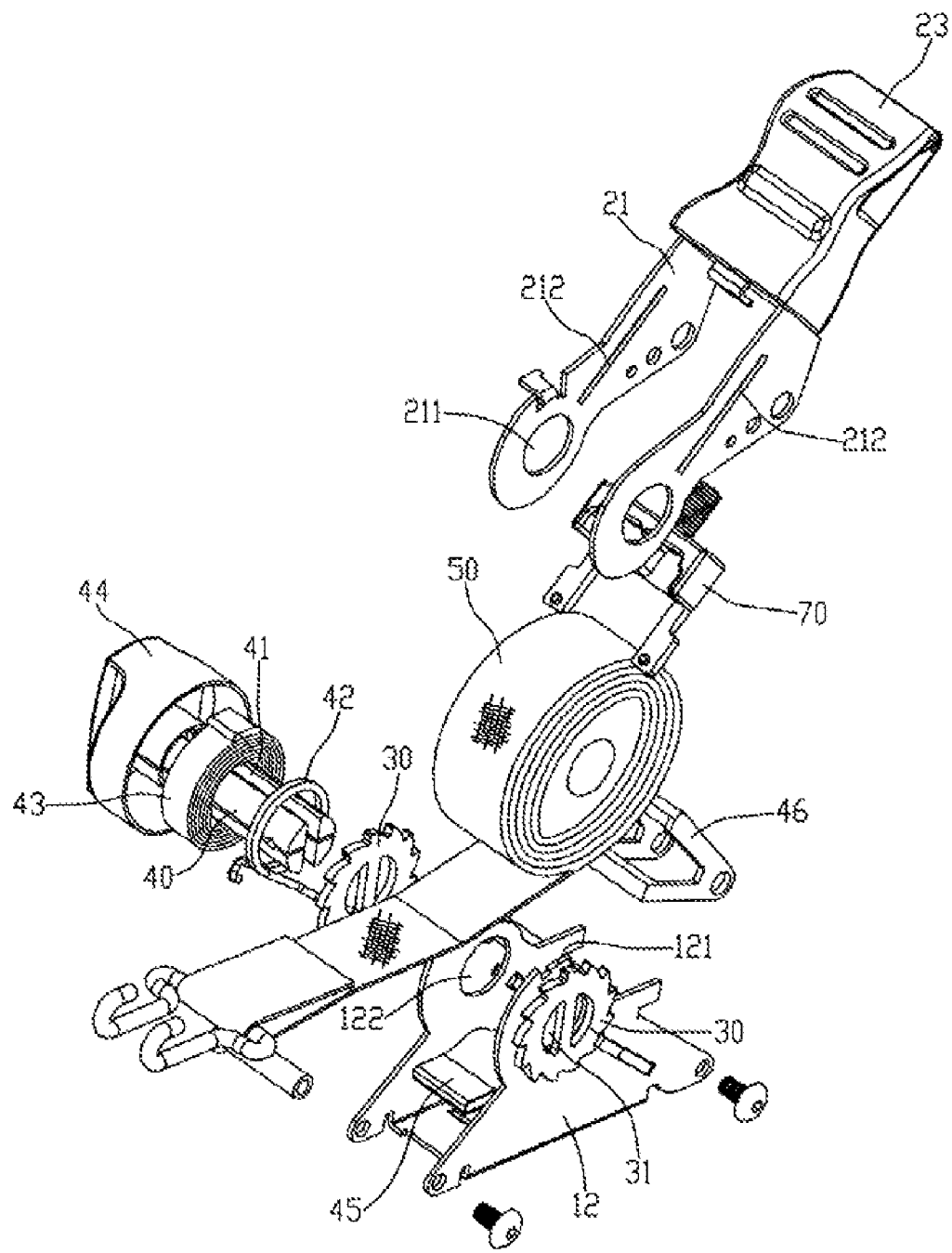
FIG. 4: the breaking-down view of this practical new model from another angle
Figure 5:
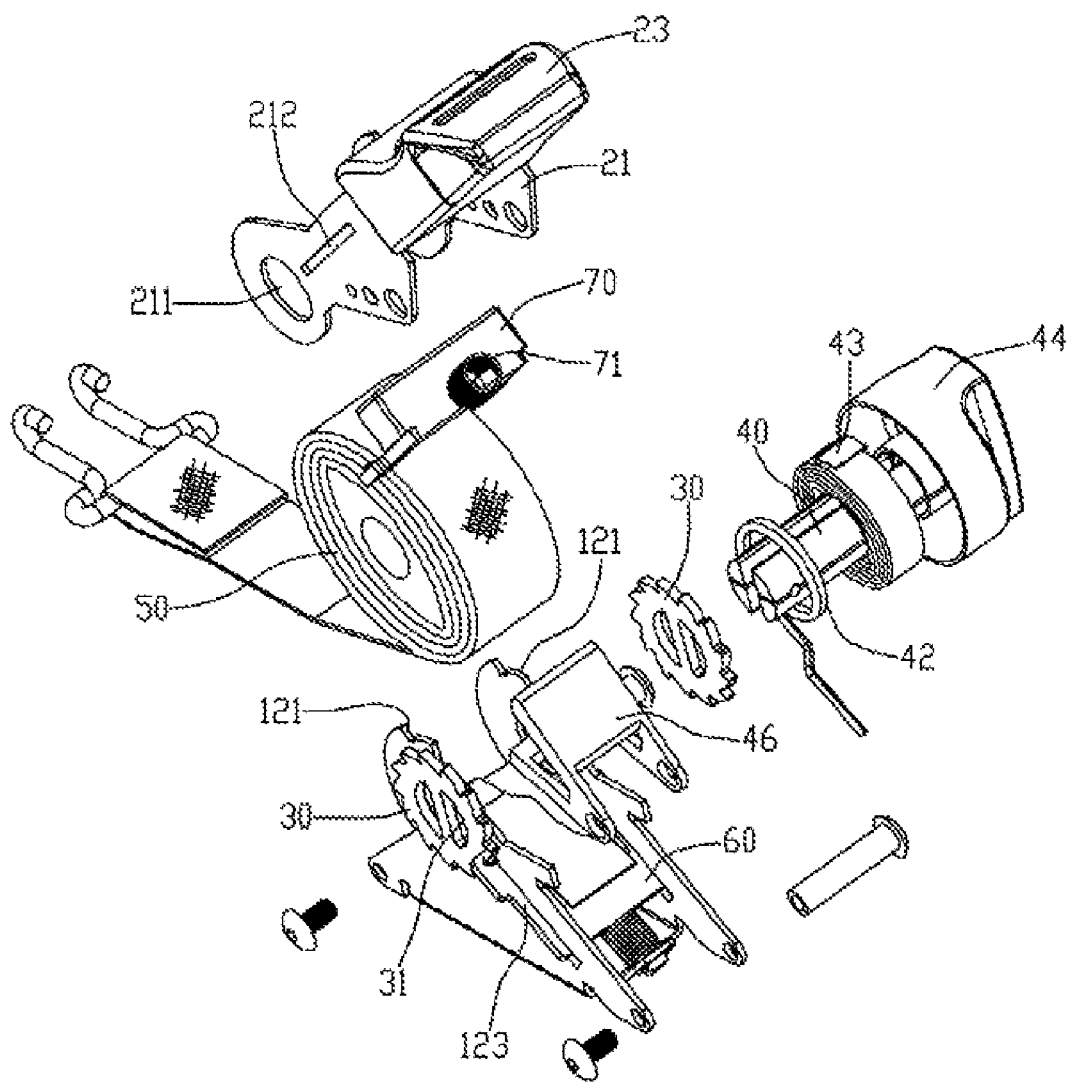
FIG. 5: the breaking-down view of this practical new model from one another angle

Please refer to Attached FIG. 1 to FIG. 5. This practical new model of binding machine composes mainly of Main Body 10, Handle 20, two Ratchet Wheel 30, Roller 40, Fastening Belt 50, Latch Reed spring 60 and Control Plate 70.

Main Body 10 has a level Bottom Board 11, whose two sides curved up to form Side Board 12. The two Side Boards 12 form a hollow space for holding objects. There are two Ratchet 121 on the top of Side Board 12. Under Ratchet 121 there is a Hole 122. At the rear of Side Board 12 there is the slot 123.

Handle 20 goes above Main Body 10. Underneath Side Board 21 there is the Hole 211, above which there is Slot 212. Also, the right Side Board 21 of Handle 20 and the right Side Board 12 of Main Section 10 are linked by Torsion Spring 42. Furthermore, there is the Plastic Grip 23 in the upper end of Handle 20 for the users to press Handle 20. The middle of Grip 23 is in the shape of circular arc, in which case Handle 20 will not be loose off easily when the users press Handle 20.

Two Ratchet Wheels 30 are located in the left and right Side Boards 12 of Main Section 10, and the left and right Side Board 21 of Handle 20 respectively. On its top there is Hole 31. Specifically, the two Ratchet Wheels 30 can also be located in the inner sides of left and right Side Board 12 of Main Section 10. This can be determined by the needs.

Roller 40 can also goes through the Hole 122 in Side Board 12 of Main Body 10, Hole 211 in Side Board 21 of Handle 20 and Hole 31 in Ratchet Wheel 30. Roller 40 consists of two bow-shape bars. Between the two bars there is a set proper space for the end of fastening belt to go through, which is the Retaining Nest 41 for the fixating the end of fastening belt. For the sections of Roller 40 that go through the outer side of Side Board 12 of Main Body 10, there is a Torsion Spring 42 and a Coil Spring 43. Both Coil Spring 43 and the Torsion Spring 42 that links Side Board 12 of Main Body 10 and Side Board 21 of Handle 20 are on the same side of Main Body 10. In the picture, Torsion 42 and Coil Spring 43 are on the right side of Main Body 10 (they can certainly be set on the left side with the same effects)

Fastening Belt 50 is in the hollow space formed by Main Body 10's Side Board 12. The tail is fixated in the Retaining Nest 41 in Roller 40. The head extends to the outer end of Main Section 10.

In addition, Roller 40 can also adopt the shape of solid or hollow cylinder besides the above structure mode. For Roller 40 applying this mode, it can remove two Ratchet wheels 30 to the inner sides of left and right Side Board 12 of Main Section 10. An axle housing, whose two ends are connected with two Ratchet wheels 30 in the left and right, is welded to the mid section of Scroll 40. The end of Fastening Belt 50 is fixated to the axle housing. So much so, when Ratchet 30 rotates, it can also drive Scroll 40 to rotate, thus laying and withdrawing Fastening Belt 50.

In addition, when adopting the cylinder-shape Roller 40, it is also feasible to weld Ratchet Wheel 30 and Scroll 40 directly and the end of Fastening Belt 50 can be fixated in Scroll 40. When Ratchet Wheel 30 rotates, it can also spur Roller 40 to rotate, thus laying and withdrawing Fastening Belt 50.

Latch Reed spring 60 is at the rear end of Roller 40. Its two sides 61 are installed in Slot 123 at the rear end of Side Board 12 of Main Body 10. The top goes match with Ratchet Wheel 30 to make the latter rotate in one single direction (in the picture it goes clockwise)

Control Plate 70 is between two Side Boards 21 of Handle 20. Its two sides are installed inside Slot 212 on Side Board 21 of Handle 20. There is the compression spring in between its top and the top of Handle 20. The bottom goes match with Ratchet Wheel 30 and the Ratchet 121 on the top of Main Section 10's Side Board 12. There is a component fixated on the top of Control Plate 70. There are two Holding Slots 72 for the fingers in the front of this moving part.

Furthermore, the section in Roller 40 that goes through some section of Side Board 12 of Main Body 10 is linked with Cover 44 in the shape of a knob. This knob-shape Cover 44 will cover Coil Spring 43 and Torsion Spring 42 to protect them. Also it can make the products better looking. The user can not only withdraw Fastening Belt 50 tightly through pressing Handle 20, he/she can also make it by rotating Cover 44.

Moreover, there is also the Plate Spring 45 in the hollow space formed by Side Board 12 of Main Section 10. The head of Plate Spring 45 stretches to the front below of Roller 40. The tail goes match with Punch Components 46 that hinges the rear of Side Board 12 of Main Body 10.

Before using this practical new model, take hold of Grip 23 in Handle 20 and pull up Control Plate 70 with the fingers, push forward Handle 20 till the bottom of Control Plate 70 goes over the first Ratchet 121 on the top of Side Board 12 of Main Section 10. Then let loose of Control Plate 70, whose bottom is stuck between two Ratchets 121 through the bounce of Compression Spring 71. Then, pull the Fastening Belt 50 to a proper length to bind the object.

When the object is fastened, take hold of Grip 23 in Handle 20 again. Pull up Control Plate 70 and press Handle 20 backward. Let loose of Control Plate 70, which is stuck by the first Ratchet 121 under the bounce of Compression Spring 71, when Control Plate 70 returns to the first Ratchet 121. Press down Handle 20. Every time Handle 20 is pressed down, Ratchet 30 will spur Roller 40 to rotate clock-wise for some angle. Since Torsion Spring 42 can spur the handle to resume the position, therefore, the user does not need to push Handle 20 upward. After repeated movements like this, Fastening Belt 50 can be tightened and the object is tightly fastened by Fastening Belt 50.

Take back Fastening Belt 50 and push Handle 20 to the position where Fastening Belt 50 is pulled out when you finish using the binding machine. Here, Roller 40 rotates freely clockwise driven by Coil Spring 43 and spurs Fastening Belt 50 to withdraw to the inside of Main Body 10. The diameter of the Fastening Belt circles formed in Roller 40 increases gradually when Fastening Belt 50 is withdrawing. When the fastening belt circle diameter increases to some extent, Fastening Belt 50 cannot withdraw automatically in the remaining one hour because of the restriction of Plate Spring 45 underneath Roller 40. Now, press Punch Components 46 that goes match with Plate Spring 45 to make Plate Spring 45 deflect downward, relieving the restriction on the diameter of fastening belt circle. Then the rest of Fastening Belt 50 can all withdraw to the inside of Main Body 10. It is very convenient.

What is claimed is:

1. An improved binding machine for fastening objects comprising:

a main body, the main body has a bottom with two side boards to form a hollow space for holding objects, two ratchets are located at top sides of the two side boards respectively, a hole is underneath the ratchets on the side boards;

a handle being over the main body atop, the handle has two side boards, there are holes at a lower end of the two side boards, the two side boards of the handle are linked with the side boards of the main body by a torsion spring;

two ratchet wheels located beside left and right sides of the main body with holes on them;

a roller, the roller goes through the holes in the side boards of the main body, the side boards of the handle and the ratchet wheels, a mid section of the roller is used for wrapping a fastening belt around;

the fastening belt is in the hollow space between the two side boards of the main body, a tail of the fastening belt is fixed to the roller and a head of the fastening belt extends to an outside of the main body;

a latch reed spring being between the two side boards of the main body at an end of the roller with a top of the latch reed spring connecting the ratchet wheel;

a control plate being between the two side boards of the handle, a compression spring is between a top of the control plate and the top of the handle, a bottom of the control plate can be inserted into or pulled out from the ratchet wheel and the ratchets on the top of the main body's side board for fixing or releasing the ratchet wheel with or from the main body;

a coil spring is on one end of the roller that is outside the main body's side board, the coil spring and the torsion spring are at the same side of the main body.

2. The binding machine of claim 1, wherein a plate spring is in the hollow space between the main body's two side boards, a head of the plate spring extends to a position that is before and below the roller, a tail of the plate spring is cooperating with a punch component hinged on the end of the main body's side board to control withdrawing of the fastening belt.

3. The binding machine of claims 1, wherein there is a grip at a top end of the handle, a mid section of the grip is in a shape of a concave circular arc.

4. The binding machine of claims 1, wherein a knob-shape cover is located besides said main body's side board and said roller.

5. The binding machine of claim 1, wherein said roller comprises two beam-shape objects with a cross section of a bow, there is a proper space between the two beam-shape objects for passing an end of the fastening belt.

6. The binding machine of claims 2, wherein there is a grip at a top end of the handle, a mid section of the grip is in a shape of a concave circular arc.

7. The binding machine of claims 2, wherein a knob-shape cover is located besides said main body's side board and said roller.

8. The binding machine of claim 3, wherein there are two slots for finger holding on a top end of the control plate.

9. The binding machine of claim 6, wherein there are two slots for finger holding on a top end of the control plate.

* * * * *